US012086427B2

(12) United States Patent
Yamparala et al.

(10) Patent No.: US 12,086,427 B2
(45) Date of Patent: Sep. 10, 2024

(54) POWER INTEGRITY MONITORING

(71) Applicant: Micron Technology, Inc., Boise, ID (US)

(72) Inventors: Sriteja Yamparala, Boise, ID (US); Fulvio Rori, Boise, ID (US); Marco Domenico Tiburzi, Avezzano (IT); Walter Di Francesco, Avezzano (IT); Chiara Cerafogli, Boise, ID (US); Tawalin Opastrakoon, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 32 days.

(21) Appl. No.: 17/677,641

(22) Filed: Feb. 22, 2022

(65) Prior Publication Data
US 2023/0266890 A1    Aug. 24, 2023

(51) Int. Cl.
*G06F 1/28* (2006.01)
*G06F 1/08* (2006.01)
*G06F 3/06* (2006.01)

(52) U.S. Cl.
CPC ............ *G06F 3/0625* (2013.01); *G06F 1/08* (2013.01); *G06F 1/28* (2013.01); *G06F 3/0653* (2013.01); *G06F 3/0673* (2013.01)

(58) Field of Classification Search
CPC ............ G06F 3/0625; G06F 1/08; G06F 1/28; G06F 3/0653; G06F 3/0673
See application file for complete search history.

(56) References Cited

U.S. PATENT DOCUMENTS

| | | | |
|---|---|---|---|
| 5,729,145 A * | 3/1998 | Blades | G01R 31/1272 324/613 |
| 8,607,036 B2 | 12/2013 | More et al. | |
| 8,612,779 B2 | 12/2013 | More et al. | |
| 8,631,369 B1 | 1/2014 | Kariat et al. | |
| 2007/0180328 A1 * | 8/2007 | Cornwell | G11C 29/56 714/E11.038 |
| 2007/0247767 A1 * | 10/2007 | Zhang | H02H 3/006 361/42 |
| 2013/0335150 A1 * | 12/2013 | Sai | H03L 7/085 331/15 |
| 2015/0082055 A1 * | 3/2015 | Grout | G06F 1/263 713/300 |
| 2015/0095666 A1 * | 4/2015 | Ananthakrishnan | G06F 1/206 713/300 |
| 2015/0185797 A1 * | 7/2015 | Cooper | G06F 1/3275 713/340 |
| 2015/0227445 A1 * | 8/2015 | Arscott | G06F 11/3062 713/340 |
| 2021/0263577 A1 * | 8/2021 | Zhang | G06F 1/28 |
| 2021/0306073 A1 * | 9/2021 | Yoshida | H04B 10/2513 |

(Continued)

*Primary Examiner* — Zahid Choudhury
(74) *Attorney, Agent, or Firm* — Brooks, Cameron & Huebsch, PLLC

(57) ABSTRACT

Various embodiments of the present disclosure relate to monitoring the integrity of power signals within memory systems. A method can include receiving a power signal at a memory component, and monitoring, via a power signal monitoring component of the memory component, an integrity characteristic of the power signal. Responsive to the integrity characteristic meeting a particular criteria, the method can include providing a status indication to a control component external to the memory component.

19 Claims, 5 Drawing Sheets

(56) References Cited

U.S. PATENT DOCUMENTS

| | | | |
|---|---|---|---|
| 2022/0012148 A1* | 1/2022 | Plum | G06F 11/3075 |
| 2022/0137969 A1* | 5/2022 | Gupta | G06F 9/3877 |
| | | | 712/34 |

* cited by examiner

POWER INTEGRITY MONITORING

TECHNICAL FIELD

Embodiments of the disclosure relate generally to memory systems, and more specifically, relate to monitoring the integrity of power signals within memory systems.

BACKGROUND

A memory system can be a storage system, such as a solid-state drive (SSD), and can include one or more memory components (e.g., memory devices) that store data. The memory components can be, for example, non-volatile memory components and volatile memory components. In general, a host system can utilize a memory system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
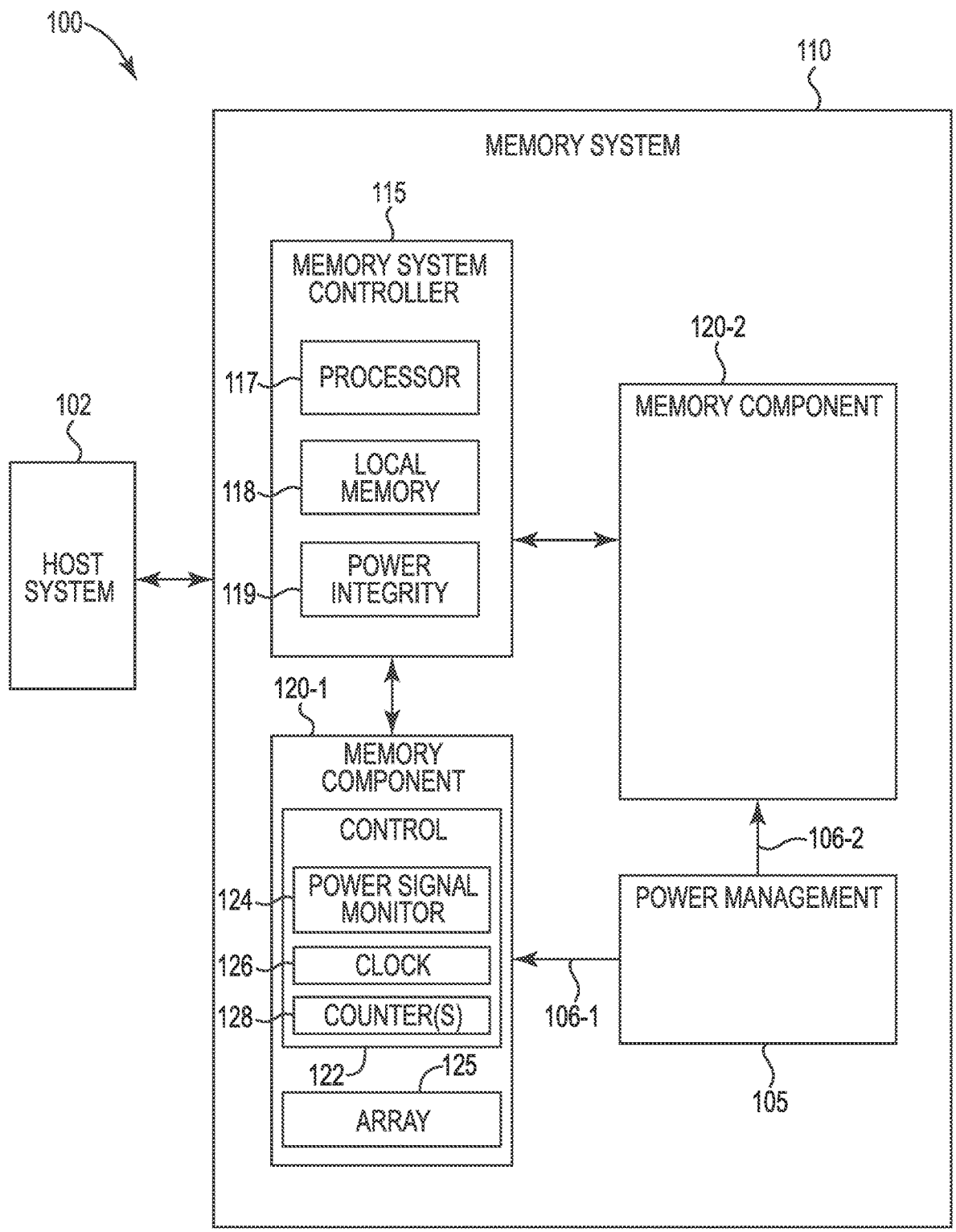
FIG. 1 illustrates an example computing environment that includes a memory system in accordance with some embodiments of the present disclosure.

Aspects of the present disclosure are directed to memory systems that include a memory component configured to monitor power signal integrity. A memory system can include a memory sub-system, which can be a storage device, a memory module, or a hybrid of a storage device and a memory module. Examples of a storage device include a solid-state drive (SSD), a Universal Flash Storage (UFS) drive, a secure digital (SD) card, and a hard disk drive (HDD). Examples of memory modules include a dual in-line memory module (DIMN) and various types of non-volatile dual in-line memory modules (NVDIMMs). In general, a host system can utilize a memory system that includes one or more memory components. The host system can provide data to be stored at the memory system and can request data to be retrieved from the memory system.

Adherence to power specifications of memory components within a memory system reduces the likelihood of data loss events. For example, power signals in violation of power specifications can lead to various issues such as data loss events, which can include over programming, unanticipated trimming, and grown bad blocks, among various other issues. Often times the host system can be responsible for ensuring compliance of power signals provided to a memory system. Additionally, some memory systems can include a power management component, such as a power management integrated circuit (PMIC), that provides power signals to constituent memory components (e.g., NAND dice, DRAM dice, etc.) of the memory system. In such instances, the PMIC can be responsible for not violating the power specifications of the memory components. However, noise on power signals provided to memory components can and does still occur despite the power compliance capabilities of the host system and/or power management component within a memory system. Additionally, the sensitivity of the memory components to power signal noise can depend on various factors including variations in manufacturing process of the memory components, stress conditions, workloads, etc.

Various embodiments of the present disclosure address the above and other deficiencies by providing a power signal monitoring component on a memory component. The power signal monitoring component can monitor various integrity characteristics of power signals provided thereto (e.g., from the host, from a PMIC, etc.). The power signal monitoring component can be configured to provide an indication (e.g., flag) to an external control component (e.g., a system controller, a host processor, etc.) responsive to the integrity characteristic meeting a particular criteria. As an example, the integrity characteristic can correspond to an amount of noise on the power signal, and the particular criteria can be a quantity of times the power signal crosses one or more voltage threshold levels and/or an amount of time the power signal amplitude is above or below a particular voltage. The integrity characteristics can be monitored over a particular time frame, which may be a fixed time frame. The memory system and/or host system can be configured to respond to power signal integrity issues determined by the power signal monitoring component. For example, the system can attempt to preserve customer data that was written to and/or read from the memory components during the particular time frame for which a power signal integrity violation occurred.

Various embodiments of the present disclosure can be implemented with circuitry that may already exist on memory components and/or with circuitry that is relatively non-complex. For example, as described further herein, a number of embodiments can obtain power signal integrity characteristics by utilizing a counter whose count is adjusted based an internal clock signal of the memory component, with the period of the clock signal that is counted being accelerated or decelerated based on the magnitude of the received power signal relative to a number of threshold voltage levels. The threshold voltage levels can be implemented, for example, with circuitry (e.g., comparators, digital-to-analog converters, etc.) available on the memory component for providing various operating voltages for program operations, erase operations, etc. Embodiments are not limited to these examples.

FIG. 1 illustrates an example computing environment (100) that includes a memory system (110) in accordance with some embodiments of the present disclosure. The memory system 110 can perform power integrity monitoring as described further herein. The memory system 110 can include media, such as memory components 120-1 and 120-2. The memory components 120-1 and 120-2 can be volatile memory components, non-volatile memory components, or a combination of such. In some embodiments, the memory system 110 is a storage system. An example of a storage system is a solid-state drive (SSD). In some embodiments, the memory system 110 is a hybrid memory/storage sub-system. In general, the computing environment 100 can include a host system 102 that uses the memory system 110. For example, the host system 102 can write data to the memory system 110 and read data from the memory system 110.

The host system 102 can be a computing device such as a desktop computer, laptop computer, network server, mobile device, or other such computing device that includes a memory and a processing device. The host system 102 can include, or be coupled to, the memory system 110 so that the host system 102 can read data from or write data to the memory system 110. The host system 102 can be coupled to the memory system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 102 and the memory system 110. The host system 102 can further utilize an NVM Express (NVMe) interface to access the memory components 120-1 and 120-2 when the memory system 110 is coupled with the host system 102 by the PCIe interface. The physical host interface can provide an interface for passing control, address, data, and other signals between the memory system 110 and the host system 102.

The memory components 120-1 and 120-2 can include any combination of the different types of non-volatile memory components and/or volatile memory components. An example of non-volatile memory components includes a negative-and (NAND) type flash memory. Each of the memory components 120-1 and 120-2 can include one or more arrays of memory cells (e.g., array 125) such as single level cells (SLCs) or multi-level cells (MLCs) (e.g., triple level cells (TLCs) or quad-level cells (QLCs)). Although non-volatile memory components such as NAND type flash memory are described, the memory components 120-1 and 120-2 can be based on various other types of memory such as a volatile memory. In some embodiments, the memory components 120-1 and 120-2 can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells.

The memory system controller 115 (hereinafter referred to as "controller") can communicate with the memory components 120-1 and 120-2 to perform operations such as reading data, writing data, or erasing data at the memory components 120-1 and 120-2 and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processing device (e.g., processor 117) configured to execute instructions stored in local memory 118. In the illustrated example, the local memory 118 of the controller 115 includes an embedded memory configured to store instructions for performing various processes, operations, logic flows, and routines that control operation of the memory system 110, including handling communications between the memory system 110 and the host system 102. In some embodiments, the local memory 118 can include memory registers storing memory pointers, fetched data, etc. The local memory 118 can also include read-only memory (ROM) for storing micro-code. While the example memory system 110 in FIG. 1 has been illustrated as including the controller 115, in another embodiment of the present disclosure, a memory system 110 may not include a controller 115, and can instead rely upon external control (e.g., provided by a processor or controller separate from the memory system 110).

In general, the controller 115 can receive commands or operations from the host system 102 and can convert the commands or operations into instructions or appropriate commands to achieve the desired access to the memory components 120-1 and 120-2. The controller 115 can be responsible for other operations such as wear leveling operations, garbage collection operations, error detection and error-correcting code (ECC) operations, encryption operations, caching operations, and address translations between a logical block address and a physical block address that are associated with the memory components 120-1 and 120-2. The controller 115 can further include host interface circuitry to communicate with the host system 102 via the physical host interface. The host interface circuitry can convert the commands received from the host system 102 into command instructions to access the memory components 120-1 and 120-2 as well as convert responses associated with the memory components 120-1 and 120-2 into information for the host system 102.

The memory system 110 includes a power management component 105 configured to provide power signals (e.g., Vcc) 106-1 and 106-2 to the respective memory components 120-1 and 120-2. Although not shown in FIG. 1, the power management component 105 can include, for example, various components such as voltage detectors, voltage converters, and or voltage regulators (e.g., buck regulator, boost regulator, low-dropout (LDO) regulator, etc.). The power management component 105 can be configured to provide power signals 106-1 and 106-2 that are in compliance with power specifications of the memory components 120-1 and 120-2. However, the signals 106-1 and/or 106-2 can have integrity issues (e.g., noise) that can adversely affect operation of the memory components 120-1 and 120-2, which can lead to loss or corruption of data being written to and/or read from the memory components during operation thereof.

As shown in FIG. 1, the memory components (e.g., 120-1) can have a control component 122 and an array of memory cells 125. The memory component 120-2 can be analogous to the memory component 120-1; however, embodiments are not so limited. For example, the memory component 120-2 can be a different type of memory component that may or may not include a control component such as control component 122). The control component 122 can comprise hardware (e.g., circuitry) for operating the memory component 120-1 (e.g., executing commands from controller 115). The control component 122 can include a power signal monitoring component 124, an internal clock 126, and one or more counters 128 that can be used in association with power signal integrity monitoring in accordance with various embodiments of the present disclosure. As described further below, the power signal monitoring component 124 can provide a status indication to a control component external to the memory component 120-1 responsive to an integrity characteristic of the power signal 106-1 meeting a particular criteria. The particular criteria can be a threshold amount of noise of the signal 106-1 during a particular time frame, for example, and can be associated with a violation of a power specification corresponding to the memory component 120-1. As an example, the threshold amount of noise can correspond to a quantity of times the magnitude of the power signal 106-1 crosses one or more threshold voltage levels; however, embodiments are not so limited. Responsive to the integrity characteristic of the signal 106-1 meeting the particular criteria, a status indication can be sent to an external component such as to controller 115 and/or to host 102, for example. The external component can log the status indications received from the memory component 120-1 and/or can take remedial actions based thereon. For instance, if data was being written to memory component 120-1 during a particular time frame in which the power signal monitoring component 124 determined that the integrity characteristic of the power signal 106-1 met the noise criteria, then controller 115 could attempt to rewrite the data to the memory component 120-1 (e.g., to array 125).

In the example shown in FIG. 1, the controller 115 includes a power integrity component 119. The power integrity component 119 can comprise hardware, firmware, and/or software associated with performing power signal monitoring in accordance with various embodiments described further herein. For example, the power integrity component can receive power signal status indications from one or more of the memory components 120-1 and 120-2. In some examples, the power integrity component 119 can log power signal events and can cause controller 115 to take various actions responsive to the power signal status indications received from the memory components 120-1, 120-2. For instance, the controller 115 can provide the power status information to the host 102 and/or can react to the power signal status indications to preserve customer data (e.g., by rewriting data, rereading data, etc.).

Figure 2A:
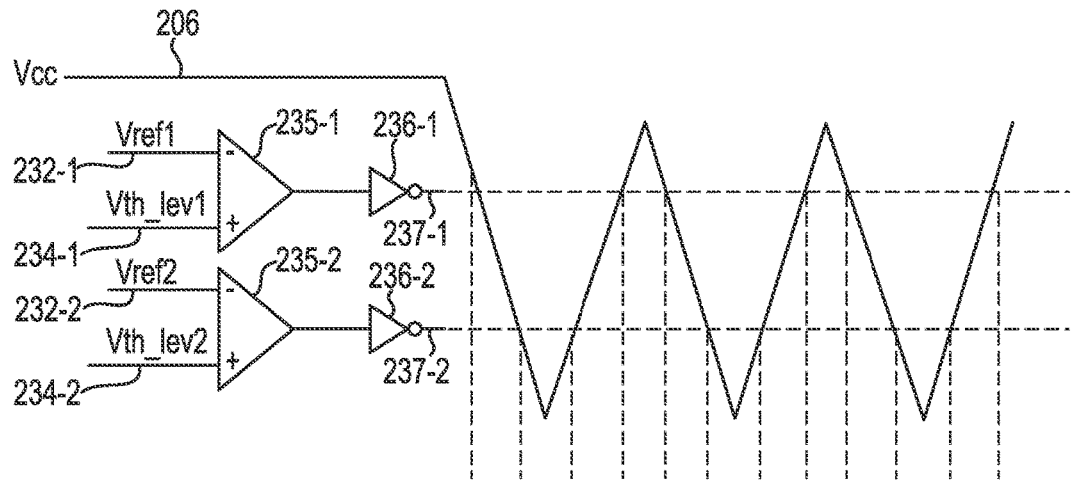
FIG. 2A illustrates an example of a portion of a power signal monitoring component in accordance with some embodiments of the present disclosure.
Figure 2B:
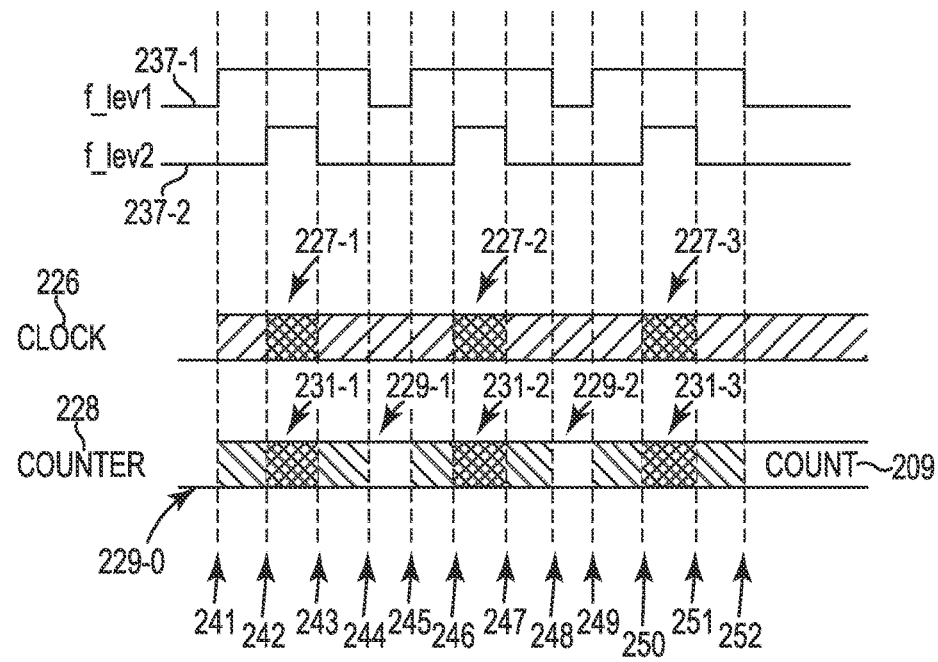
FIG. 2B illustrates example logic signals and counter values associated with monitoring the power signal shown in FIG. 2A in accordance with some embodiments of the present disclosure.

FIG. 2A illustrates an example of a portion of a power signal monitoring component (e.g., power signal monitoring component 124 shown in FIG. 1) associated with monitoring the integrity of a power signal (e.g., power signal 206) in accordance with some embodiments of the present disclosure. FIG. 2B illustrates example logic signals and counter values associated with monitoring the power signal shown in FIG. 2A in accordance with some embodiments of the present disclosure.

The power signal 206 can be provided to a memory component (e.g., 120-1) from an external source such as a host system (e.g., 102), power management component (e.g., 105), or other source external to the memory component. As an example, the power signal 206 may correspond to a supply voltage (e.g., Vcc) of 2.5V, although embodiments are not limited to a particular supply voltage value. In the example shown in FIG. 2A, the power signal monitoring circuitry is configured to monitor negative amplitude noise of power signal 206; however, as one of ordinary skill in the art will appreciate, the various aspects described herein can be applied to monitor positive amplitude noise as well or instead.

In this example, the power signal monitoring component (e.g., 124) is configured to determine when the power signal 206 crosses a first voltage threshold level 234-1 (Vth_lev1) and/or a second voltage threshold level 234-2 (Vth_lev2). The comparator 235-1 output can flip each time the reference voltage 232-1 (Vref1) is breached (e.g., each time it drops below and above Vth_lev1) and comparator 235-2 can flip each time the reference voltage 232-2 (Vref2) is breached. In this example, the power signal monitoring component includes inverters 236-1 and 236-2 coupled to the respective outputs of comparators 235-1 and 235-2. As described further below in association with FIG. 2B, the inverter outputs 237-1 (f_lev1) and 237-2 (f_lev2) can affect the count of a counter 228 used to provide power signal integrity characteristics.

FIG. 2B illustrates a particular time frame (e.g., from a time 241 to a time 252) corresponding to power signal monitoring in accordance with a number of embodiments of the present disclosure. In various embodiments, the count of a counter (e.g., 228) can provide an indication of an amount of noise on the power signal (e.g., 206) received by a memory component (e.g., 120-1). As an example, logic of the power signal monitoring component can adjust the count of counter 228 differently depending on whether the power signal is above or below each of a number of threshold levels (e.g., threshold levels 234-1 and 234-2). For instance, a clock 226 internal to the memory component can be input to the power monitoring component logic and the count can be adjusted per clock cycle depending on the status of the power signal 206. As an example, the counter 228 can be incremented once for each period of the clock 226 when the power signal 206 is below threshold level 234-1 but above threshold level 234-2, and the counter 228 can be incremented twice per period of the clock 226 when the power signal 206 is below threshold level 234-2. In this manner, the total count of the counter 228 over a particular time frame can serve as a proxy for the amount of noise on the power signal 206. For example, the value of the counter 228 will be greater for time periods in which the power signal 206 is below threshold level 234-1 and 234-2 as compared to time periods in which the power signal is above threshold level 234-1 and/or 234-2. Therefore, in this example, a greater count value 209 of counter 228 at time 252 can correlate to a reduced integrity characteristic of power signal 206 as compared to a lesser count value over the same time period.

In a number of embodiments, a threshold count value 209 can be used as a criteria for providing a status indication to an external control component such as to controller 115 shown in FIG. 1. For example, a flag can be sent to the controller 115 each time the count 209 reaches a threshold value over a particular time period (e.g., a fixed time period such as represented by time 241 to 252). Responsive to the count 209 reaching the threshold value, the memory system (e.g., 110) or host (e.g., 102) can perform one or more actions to preserve customer data, for example. Embodiments are not limited to use of a single counter 228. For example, a power signal monitoring component can include an additional counter to count the quantity of times the power signal crosses one or both of the threshold levels 234-1 and 234-2.

In the example shown in FIG. 2B, the counter 228 can initially have a count value of zero ("0"). At time 241, the power signal 206 drops below the first threshold level 234-1, which causes logic signal 237-1 (f_lev1) to flip (from 0 to 1 in this example). Responsive to f_lev1 going high, the counter 228 is activated and begins counting (e.g., one count increment per period of clock 226). At time 242, the power signal 206 drops below the second threshold level 234-2, which causes logic signal 237-2 (f_lev2) to flip (from 0 to 1 in this example). Responsive to f_lev2 going high, the counter 228 begins counting differently (e.g., two count increments per period of clock 226). At time 243, f_lev2 goes low responsive to the power signal 206 going back above threshold level 234-2, which results in the counter again incrementing by one per period of clock 226.

Time periods 227-1, 227-2, and 227-3 indicate times at which the period of clock 226 is decreased for purposes of incrementing the counter 228. As such, times 227-1, 227-2 and 227-3 correspond to respective times 231-1, 231-2, and 231-3 of counter 228. Times 229-0, 229-1, and 229-2 correspond to times in which the counter is not incremented since both f_lev1 and f_lev2 are low due to the power signal 206 being above both threshold levels 234-1 and 234-2.

Figure 3:
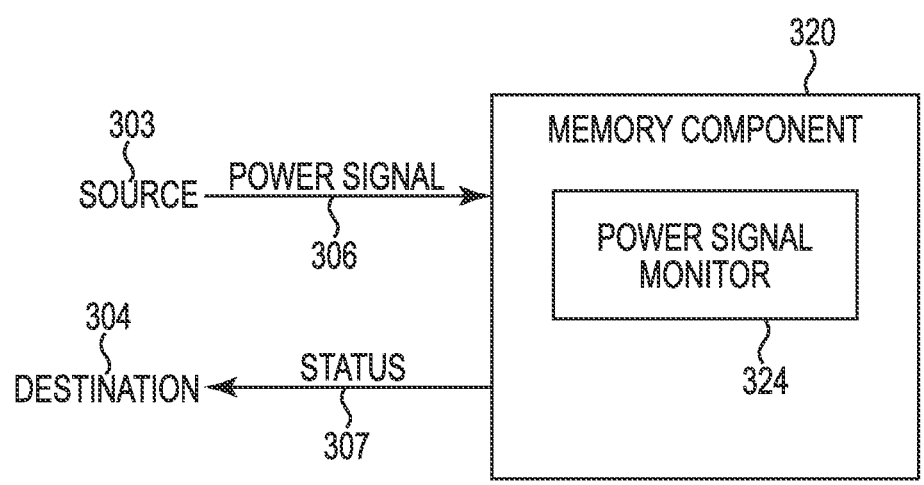
FIG. 3 illustrates an example of a memory component having a power signal monitoring component in accordance with some embodiments of the present disclosure.

FIG. 3 illustrates an example of a memory component 320 having a power signal monitoring component 324 in accordance with some embodiments of the present disclosure. The memory component 320 can be analogous to memory component 120-1 described in FIG. 1.

The memory component 320 can be, for example, a NAND memory device (e.g., NAND die); however, embodiments are not limited to a particular type of memory component. As shown in FIG. 3, the memory component 320 can be configured to receive a power signal 306 from an external source 303. The source 303 can be, for example, a PMIC of a memory system, a host system (e.g., host system 102), or some other source external to the memory component 320.

The memory component 320 includes a power signal monitoring component 324 that can monitor the integrity of the power signal 306 provided to the memory in accordance with embodiments described herein. For example, the power signal monitoring component 324 can comprise logic circuitry configured to operate a counter based on an internal clock signal, with the counter value providing a measure of signal integrity (e.g., noise) corresponding to the power signal 306 over a particular time window, which can be a rolling time window.

Responsive to the power signal monitoring component 324 determining that the integrity characteristics of the power signal 306 have met a particular criteria, a status indication 307 can be sent to a destination 304 external to the memory component 320. The destination can be, for example, a system controller such as controller 115 shown in FIG. 1, a host system such as host 102 shown in FIG. 1, or some other external destination.

Figure 4:
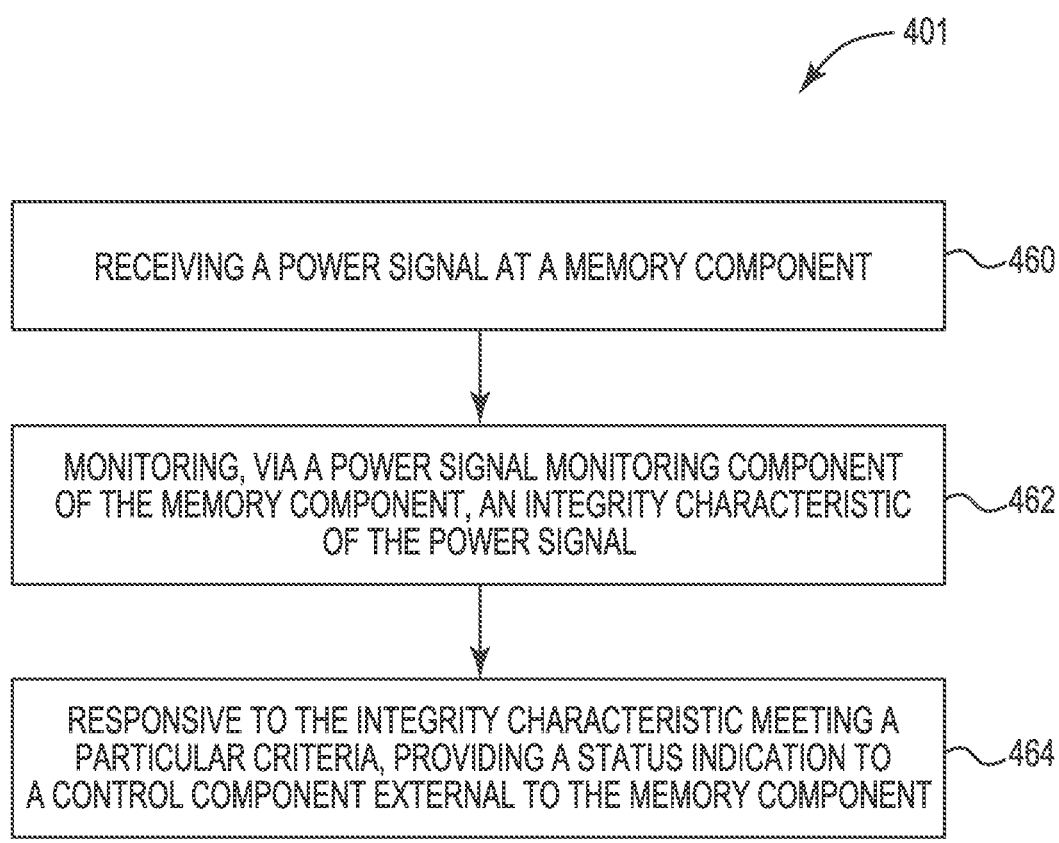
FIG. 4 is a flow diagram of an example method for monitoring power signal integrity in accordance with some embodiments of the present disclosure.

FIG. 4 is a flow diagram of an example method 401 for monitoring power signal integrity in accordance with some embodiments of the present disclosure. The method 401 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 401 is performed by the power signal monitor component 124 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 460, the method 401 receiving a power signal at a memory component. At block 462, the method includes monitoring, via a power signal monitoring component of the memory component, an integrity characteristic of the power signal. The integrity characteristic can be, for example, an amount of noise associated with the power signal. In a number of embodiments, monitoring the integrity characteristic includes determining a quantity of times the power signal crosses a particular threshold level within a particular time period, and the particular criteria is a threshold quantity of times the power signal crosses the particular threshold level within the particular time period. In a number of embodiments, monitoring the integrity characteristic includes determining an amount of time the power signal remains above or below a particular threshold level, and the particular criteria is a threshold amount of time the power signal remains above or below the particular threshold level.

Monitoring the integrity characteristic of the power signal can include activating a counter on the memory component responsive to the power signal crossing a first threshold level, and a count of the counter can be updated based on an internal clock signal of the memory component. Monitoring the integrity characteristic of the power signal can include adjusting the count of the counter by a first quantity per period of the internal clock signal responsive to the power signal crossing the first threshold level, and adjusting the count of the counter by a second quantity per period of the internal clock signal responsive to the power signal crossing a second threshold level. In various embodiments, the integrity characteristic of the power signal can be monitored in association with a particular operation performed on a memory array of the memory component, and a control component external to the memory component can be configured to, responsive to receiving the status indication, perform an action to preserve data associated with the particular operation.

At block 464 the method includes responsive to the integrity characteristic meeting a particular criteria, providing a status indication to a control component external to the memory component. The status indication can be, for example, a flag indicating a violation of a power specification of the memory component.

Figure 5:
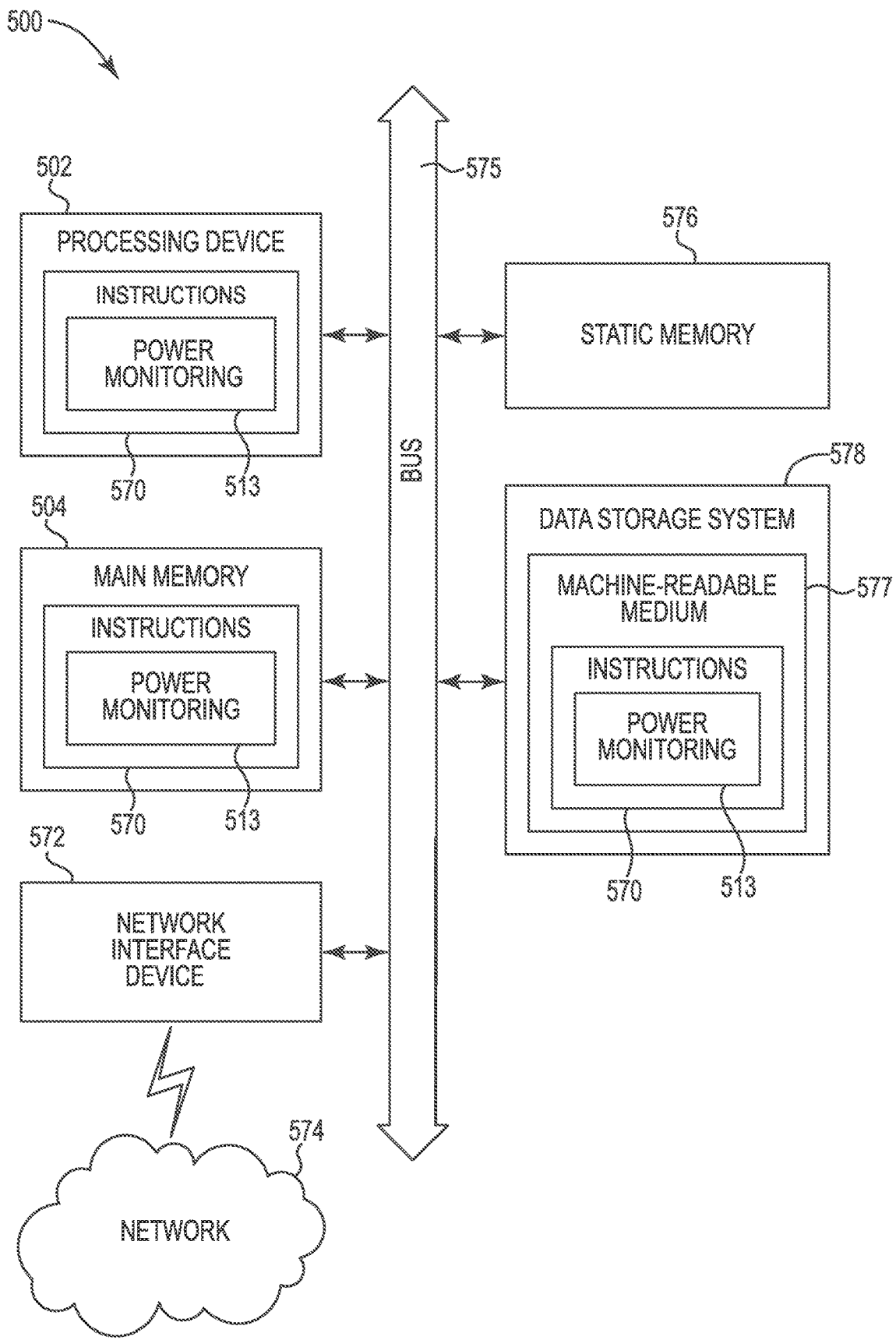
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 102 of FIG. 1) that includes, is coupled to, or utilizes a memory system (e.g., the memory system 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 576 (e.g., flash memory, static random access memory (SRAM), etc.), and a data storage system 578, which communicate with each other via a bus 575.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 570 for performing the operations and steps discussed herein. The computer system 500 can further include a network interface device 572 to communicate over the network 574.

The data storage system 578 can include a machine-readable storage medium 577 (also known as a computer-readable medium) on which is stored one or more sets of instructions 570 or software embodying any one or more of the methodologies or functions described herein. The instructions 570 can also reside, completely or at least partially, within the main memory 504 and/or within the processing device 502 during execution thereof by the computer system 500, the main memory 504 and the processing device 502 also constituting machine-readable storage media. The machine-readable storage medium 577, data storage system 578, and/or main memory 504 can correspond to the memory system 110 of FIG. 1.

In a number of embodiments, the instructions 570 include instructions 513 to implement power monitoring functionality corresponding to a power signal monitor component (e.g., the power monitor component 124 and/or power integrity component 119 of FIG. 1). While the machine-readable storage medium 577 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The figures herein follow a numbering convention in which the first digit or digits correspond to the drawing figure number and the remaining digits identify an element or component in the drawing. Similar elements or components between different figures may be identified by the use of similar digits. For example, 124 may reference element "24" in FIG. 1, and a similar element may be referenced as 324 in FIG. 3. As will be appreciated, elements shown in the various embodiments herein can be added, exchanged, and/or eliminated so as to provide a number of additional embodiments of the present disclosure.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving a supply voltage power signal at a memory component;
monitoring, via a supply voltage power signal monitoring component of the memory component, an integrity characteristic of the supply voltage power signal, wherein monitoring the integrity characteristic of the supply voltage power signal includes wherein the integrity characteristic is an amount of noise on the supply voltage power signal and wherein monitoring includes determining a quantity of times the supply voltage power signal crosses a particular voltage threshold level within a particular time period; and
responsive to determining that the supply voltage power signal crosses the particular voltage threshold level a threshold quantity of times within the particular time period, providing a status indication to a control component external to the memory component.

2. The method of claim 1, wherein:
monitoring the integrity characteristic of the supply voltage power signal includes determining an amount of time the supply voltage power signal remains above or below the particular voltage threshold level; and
a particular criteria is a threshold amount of time the supply voltage power signal remains above or below the particular voltage threshold level.

3. The method of claim 1, wherein monitoring the integrity characteristic of the supply voltage power signal includes activating a counter on the memory component responsive to the supply voltage power signal crossing a first voltage threshold level, and wherein a count of the counter is updated based on an internal clock signal of the memory component.

4. The method of claim 3, wherein monitoring the integrity characteristic of the supply voltage power signal further includes:
adjusting the count of the counter by a first quantity per period of the internal clock signal responsive to the supply voltage power signal crossing the first voltage threshold level; and
adjusting the count of the counter by a second quantity per period of the internal clock signal responsive to the supply voltage power signal crossing a second voltage threshold level.

5. The method of claim 1, wherein the method includes monitoring the integrity characteristic of the supply voltage power signal in association with a particular operation performed on a memory array of the memory component; and wherein the control component external to the memory component is configured to, responsive to receiving the status indication, perform an action to preserve data associated with the particular operation.

6. The method of claim 1, wherein monitoring the integrity characteristic of the supply voltage power signal includes measuring positive amplitude noise and negative amplitude noise associated with the supply voltage power signal.

7. The method of claim 1, wherein the method includes receiving the supply voltage power signal from a power management integrated circuit (PMIC) of a memory system, and wherein the memory component is a memory device comprising an array of NAND Flash memory cells.

8. An apparatus, comprising:
a memory component configured to receive a supply voltage power signal; and
a supply voltage power signal monitoring component of the memory component configured to monitor an integrity characteristic of the supply voltage power signal, wherein the integrity characteristic is an amount of noise on the supply voltage power signal and wherein monitoring the integrity characteristic of the power signal includes determining a quantity of times the supply voltage power signal crosses a particular voltage threshold level within a particular time period;
wherein the supply voltage power signal monitoring component is configured to provide a status indication to a control component external to the memory component responsive to determining that the supply voltage power signal crosses the particular voltage threshold level a threshold quantity of times within the particular time period; and
wherein the control component is a controller external to the memory component and is configured to perform operations on the memory component.

9. The apparatus of claim 8, wherein the integrity characteristic corresponds to an amount of noise of the supply voltage power signal received by the memory component.

10. The apparatus of claim 8, wherein the apparatus comprises a memory system, and wherein the memory system comprises:
a power management integrated circuit (PMIC) configured to provide the supply voltage power signal to the memory component; and
the controller is configured to receive commands from a host.

11. The apparatus of claim 10, wherein the memory component comprises a NAND Flash memory device.

12. The apparatus of claim 8, wherein the supply voltage power signal monitoring component comprises:
a first comparator configured to determine when the supply voltage power signal crosses a first voltage threshold level; and
a second comparator configured to determine when the supply voltage power signal crosses a second voltage threshold level.

13. The apparatus of claim 12, wherein the first voltage threshold level and the second voltage threshold level are adjustable via the control component.

14. The apparatus of claim 8, wherein the supply voltage power signal monitoring component comprises:
a counter; and
logic configured to:
receive an internal clock signal of the memory component as an input;
adjust a count of the counter by a first quantity per period of the internal clock signal responsive to the supply voltage power signal crossing a first voltage threshold level; and
adjust the count of the counter by a second quantity per period of the internal clock signal responsive to the supply voltage power signal crossing a second voltage threshold level.

15. The apparatus of claim 14, wherein a particular criteria corresponds to a threshold value of the count after a particular amount of time.

16. The apparatus of claim 15, wherein:
the particular amount of time is a fixed time frame; and
the logic is configured to reset the counter upon expiration of the fixed time frame.

17. The apparatus of claim 8, wherein the control component external to the memory component comprises a controller configured to log supply voltage power signal events associated with the status indication.

18. A system, comprising:
- a memory component;
- a controller external to the memory component and configured to perform access operations on a memory array of the memory component;
- a power component configured to provide a supply voltage power signal to the memory component; and
- a power signal monitoring component of the memory component configured to monitor an integrity characteristic of the supply voltage power signal, wherein the integrity characteristic is an amount of noise on the supply voltage power signal; and
- wherein the supply voltage power signal monitoring component is configured to provide a status indication to the controller responsive to the integrity characteristic meeting a particular criterion.

19. The system of claim 18, wherein the status indication provides an indication of:
- a quantity of times the supply voltage power signal crosses one or more voltage threshold levels within a particular time frame; or
- an amount of time within the particular time frame that the supply voltage power signal is above an uppermost threshold level of the one or more voltage threshold levels or below a lowermost threshold level of the one or more threshold levels; or
- both.

* * * * *